United States Patent [19]

Tanaka et al.

[11] Patent Number: 5,025,474
[45] Date of Patent: * Jun. 18, 1991

[54] SPEAKER SYSTEM WITH IMAGE PROJECTION SCREEN

[75] Inventors: Tsuneo Tanaka, Nishinomiya; Kazue Sato, Neyagawa; Hiroyuki Takewa, Kaizuka; Akira Kurozuka, Neyagawa; Tadashi Tamura, Kadoma; Katsuji Hattori, Takarazuka; Satoshi Takayama, Hirakata; Kosaku Murata, Kobe; Katsuaki Satoh, Osaka; Mituhiko Serikawa, Hirakata; Youichi Kimura, Ashiya; Shuichi Obata, Kyoto, all of Japan

[73] Assignee: Matsushita Electric Industrial Co., Ltd., Osaka, Japan

[*] Notice: The portion of the term of this patent subsequent to Feb. 6, 2007 has been disclaimed.

[21] Appl. No.: 249,954

[22] Filed: Sep. 27, 1988

[30] Foreign Application Priority Data

Sep. 29, 1987 [JP] Japan .................. 62-245101
Nov. 20, 1987 [JP] Japan .................. 62-294418
Dec. 1, 1987 [JP] Japan .................. 62-305016

[51] Int. Cl.$^5$ .............................. H04R 1/02
[52] U.S. Cl. ................... 381/90; 381/159; 381/205; 181/148; 181/160; 181/164; 350/119
[58] Field of Search ............ 381/202, 205, 203, 152, 381/158, 159, 88, 90, 24; 181/148, 150, 141, 199, 160, 164, 165, 151, 157; 350/118, 117, 119, 120; 352/11, 104

[56] References Cited

U.S. PATENT DOCUMENTS

| | | | |
|---|---|---|---|
| 1,778,084 | 10/1930 | Nevin | 350/118 |
| 1,817,630 | 8/1931 | Kroesen | 350/118 |
| 4,251,045 | 2/1981 | Meyerle | 181/148 |
| 4,252,211 | 2/1981 | Matsuda et al. | 381/158 |
| 4,385,210 | 5/1983 | Marquiss | 181/150 |
| 4,433,749 | 2/1984 | Watkins | 181/199 |
| 4,899,390 | 2/1990 | Takewa et al. | 381/154 |

Primary Examiner—Forester W. Isen
Assistant Examiner—M. Nelson McGeary, III
Attorney, Agent, or Firm—Spencer & Frank

[57] ABSTRACT

A speaker system has an acoustic diaphragm and an image projection screen provided on a surface of the diaphragm integrally therewith so as to enable the user to enjoy both realistic image on the screen and powerful sound reproduced through the diaphragm. The rear surface of the diaphragm is closed at a peripheral portion thereof while the central portion of the rear surface of the diaphragm is opened to the exterior, so that the speaker system can provide a high level of reproduced sound pressure in low-pitched region, while the thickness of the speaker is reduced remarkably. The diaphgram can be driven by a plurality of driving units so that the speaker system can operate only with an ordinary stereophonic amplifier. The diaphragm can be composed of a pair of diaphragm elements capable of vibrating independently of each other and the screen may be integrally and commonly attached to the surfaces of these diaphragm elements in such a manner as to allow the diaphragm elements to vibrate independently of each other, whereby the speaker system can operate in stereophonic mode. Any variation in the acoustic characteristic attributable to variation in the condition of installation is compensated for by a change in the ratio of the opened area of the rear surface of the diaphragm to the whole effective vibration area or by a selective provision of a sound absorbing member on the rear side of the cabinet.

18 Claims, 12 Drawing Sheets

F I G. 15
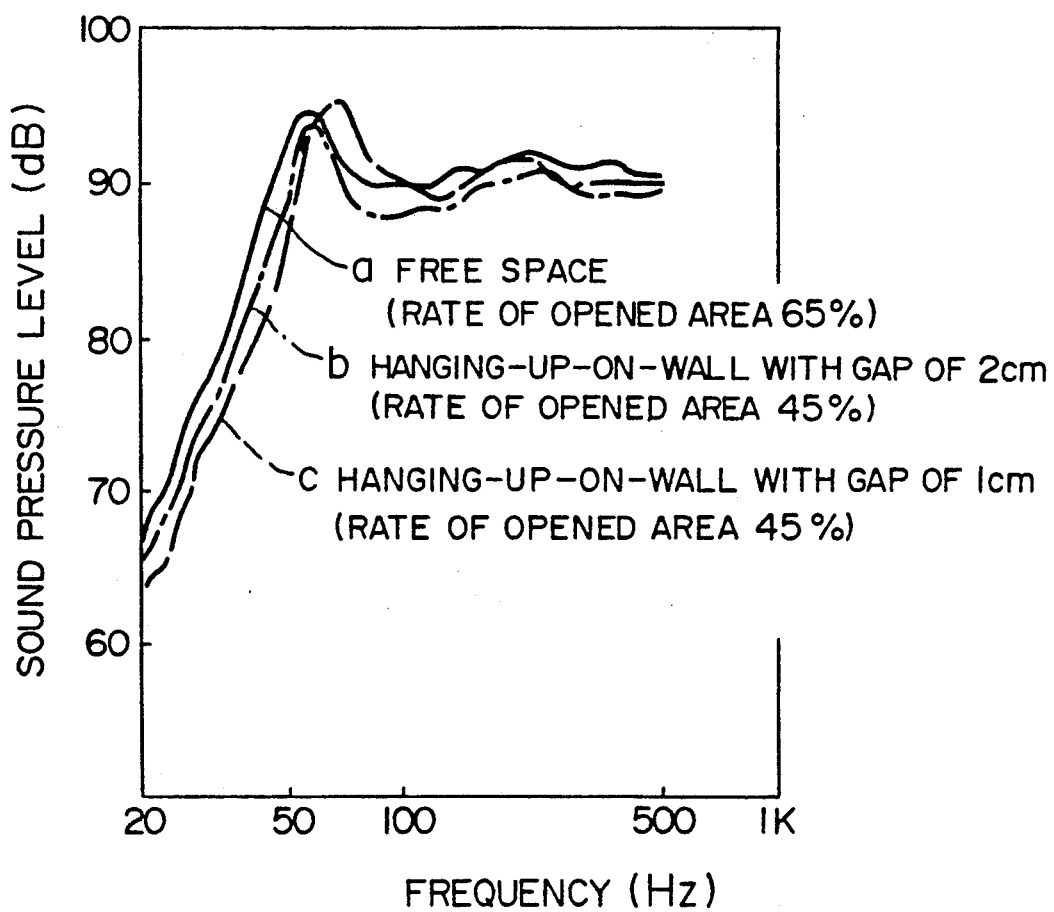

SPEAKER SYSTEM WITH IMAGE PROJECTION SCREEN

BACKGROUND OF THE INVENTION

Field of the Invention

The present invention relates to a speaker system in which an acoustic diaphragm and an image projection screen are incorporated as a unit.

Current progress of technology in the field of audiovisual systems has given rise to a demand for a system which would enable one to enjoy images projected on a large screen with powerful sound In general, speaker systems used in combination with large-size image projection screen are sorted into three types: a first type in which speakers are disposed behind the screen, a second type in which speakers are disposed on both lateral sides or below the image projection screen and a third type in which the image projection screen itself vibrates so as to function as an acoustic diaphragm. The system of the first type is used, for example, in cinema houses. In the system of this type, the acoustic characteristic is impaired by the screen which is disposed on the front side of the speaker. In addition, the brightness of the image on the screen is inevitably low due to porosity of the screen which is as high as 10 to 20%. The system of the second type has a wide use including home audio-visual systems This system is disadvantageous in that a large space is required for placing large speakers which can reproduce powerful sound, in addition to the space for installation of the screen. In particular, a problem has been encountered with this system in that the unbalance between the realism of the image and the sound level is increased as the size of the image increases. Namely, the sound level cannot be increased in such a manner as to match for enhanced realism of the image projected on a large screen.

A description will be given hereunder as to the third type of system which is most relevant to the present invention, with specific reference to FIGS. 1 and 2a and 2b.

Referring to FIG. 1, a known speaker system of the type in which an image projection screen itself vibrates has a diaphragm or curved screen 1 and diaphragm driving devices 2 which are secured to the lower end of the diaphragm 1. The driving devices 2 drive the diaphragm in the directions of the double-head arrow (b) perpendicular to the plane of the diaphragm by making use of the curvature of the diaphragm 1 so as to generate sound waves.

FIGS. 2a and 2b show, in plan and in section, another known speaker system of the type which vibrates a screen serving also as a diaphragm. In this system, a screen 1 serving as a diaphragm, driven by driving sources 2, has endless grooves 3 formed in the diaphragm 1. The stiffness of the diaphragm 1 is much smaller in the region where the endless grooves 3 are formed than in other regions. The vibration, therefore, takes place in the regions 4 surrounded by the endless grooves and is not transmitted to other regions. That is, only the regions 4 actually serve as diaphragms.

In the arrangement shown in FIG. 1, however, the diaphragm is limited only to the curved screen. This system, therefore, has only a limited application. In addition, sound waves transmitted from the diaphragm forwardly and backwardly interfere with each other by diffraction around the diaphragm in such a manner that sound waves of inverse phases cancel each other. In consequence, the level of the sound pressure is significantly reduced particularly in a bass or low-pitched sound region.

The speaker system shown in FIGS. 2a and 2b encounters a problem in that the stress is concentrated to the regions of the endless grooves 3 where the thickness of the diaphragm 1 is smaller than in other regions, so that the diaphragm 1 tends to be broken when the diaphragm 1 vibrates. In addition, in order to obtain a large sound pressure level with the vibration regions having limited areas, it is necessary that these vibration regions vibrate with a large amplitude. Such a large vibration undesirably causes unfavorable effects on the image, e.g., oscillation of the image. The interference between the sound waves of opposite phases also is encountered with this type of speaker system.

SUMMARY OF THE INVENTION

Accordingly, an object of the present invention is to provide a speaker system integrated with an image screen, which has thickness small enough to enable the system to hang from a wall but yet capable of reproducing sound even in a bass or low-pitched sound region.

To this end, according to the present invention, there is provided a speaker system comprising: a diaphragm carrying a screen on a surface thereof, a driving source for driving the diaphragm, and a cabinet which is constructed such that a portion of the rear face of the diaphragm is closed while the other portion is opened.

According to this arrangement, since only a portion of the rear surface of the diaphragm is closed, the stiffness of air in the cabinet is reduced to obtain a lower level of the lowest resonance frequency of diaphragm as compared with the known speaker system in which the whole area of the rear surface of the diaphragm is encased and closed. When the open region of the rear surface of the diaphragm is defined at the center of the rear surface, it is possible to make the phase differential between the sound waves emitted from the front and rear sides of the diaphragm larger at the hearing point, thus reducing the tendency for the sound waves to cancel each other due to sound diffraction, thereby making it possible to obtain a good sound reproduction characteristic in the low-pitched sound region even with reduced thickness of the speaker. The speaker system of the invention is less liable to suffer from the problems encountered with known arrangements such as impairment in the quality of the reproduced sound and reduction in the image brightness attributable to porosity of the screen. In addition, the speaker system of the present invention requires only a small installation space and can easily be hung from the wall or embedded in the wall.

BRIEF DESCRIPTION OF THE DRAWINGS

FIG. 15 is an illustration of variation of the sound pressure-frequency characteristic caused by variation in the installation condition and in the rates of the closed and opened portions in the seventh embodiment;

DESCRIPTION OF THE PREFERRED EMBODIMENTS

Preferred embodiments of the present invention will be described hereunder with reference to the accompanying drawings.

Figure 1:
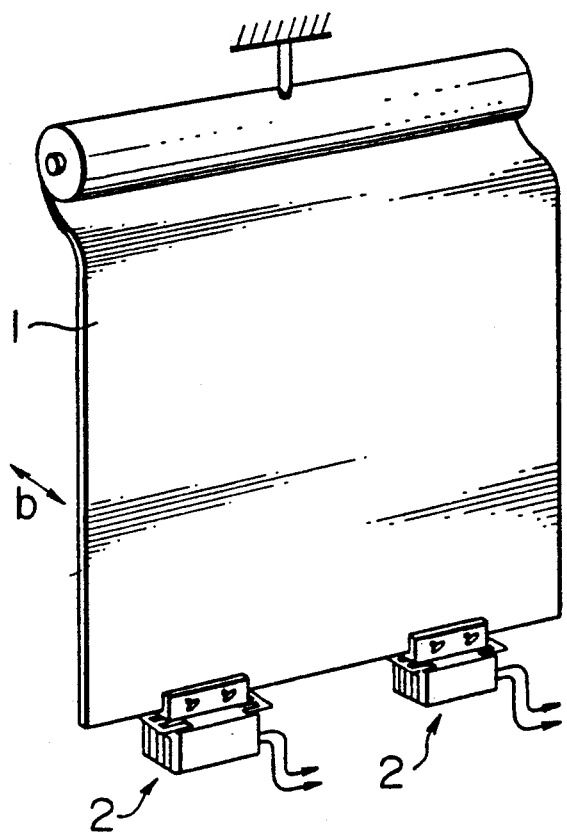
FIG. 1 is an illustration of a conventional speaker system with a screen of a type in which an imaging screen itself serves as an acoustic diaphragm.
Figure 2A:
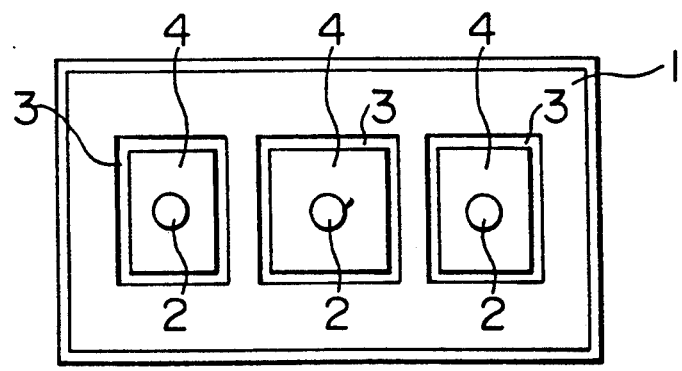
FIGS. 2a and 2b are illustrations of a conventional speaker system with a screen of a type in which selected regions of the screen serve as an acoustic diaphragm.
Figure 2B:
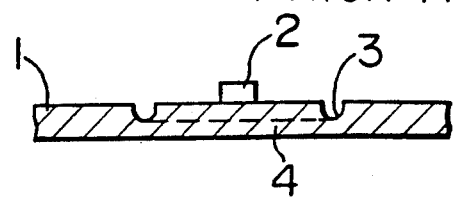
Figure 3:
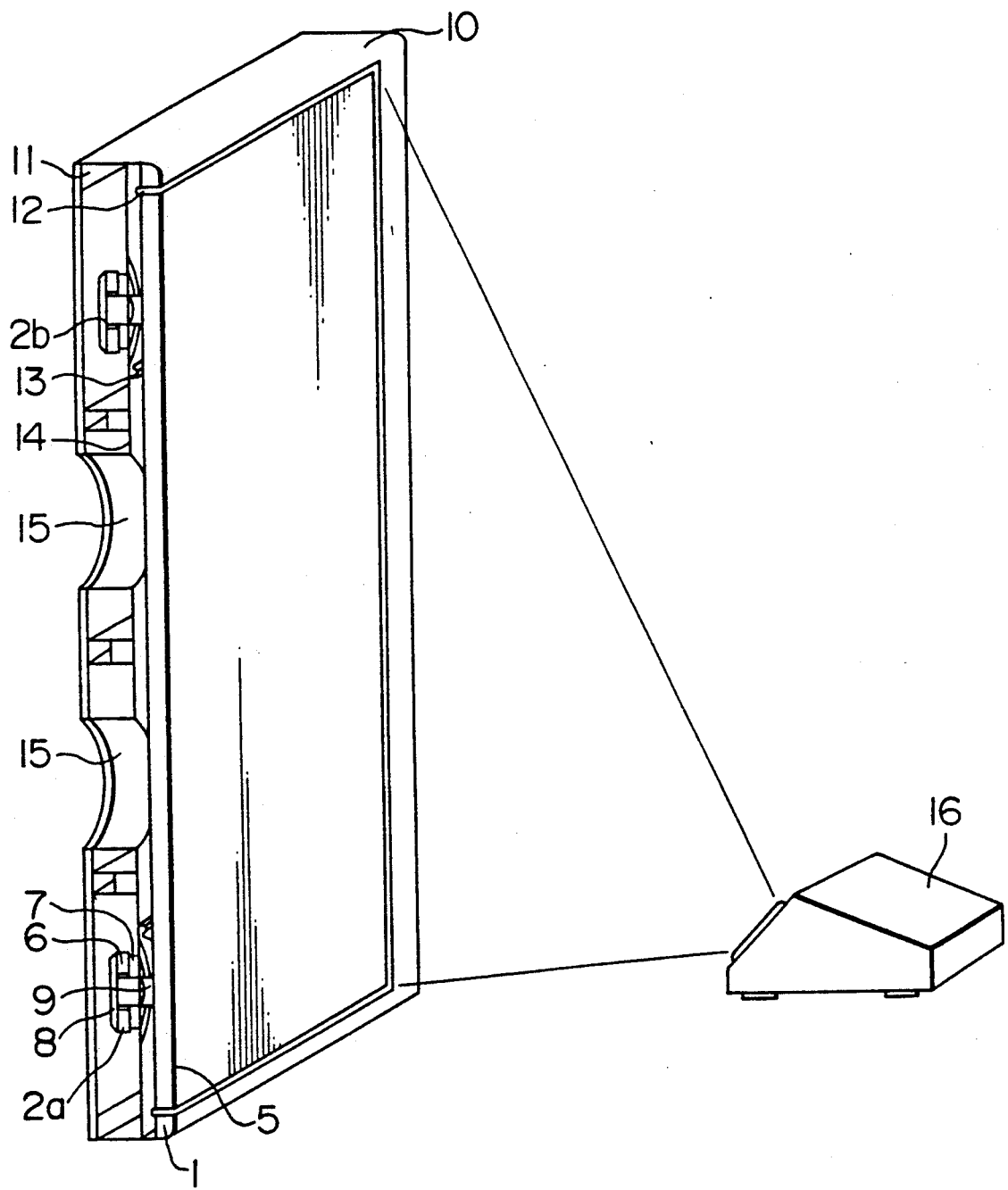
FIG. 3 is an illustration of a first embodiment of the speaker system in accordance with the present invention.

Referring first to FIG. 3 which is a sectional view of a first embodiment of the present invention, there is shown a diaphragm 1 which is 1,422 mm wide and 1,067 mm high corresponding to 70-inch screen and a weight of about 3,400 gr. A reflection type screen 5 having a weight of about 850 gr and dimensions equal to that of the diaphragm and made of polyvinylchloride is adhered to the surface of the diaphragm 1. The diaphragm 1 with the screen 5 adhered thereto is driven by driving devices or sources 2. Any unfavorable effect caused on the acoustic characteristic of the diaphragm 1 by the weight of the screen 5 adhered thereto can be materially eliminated, provided that the driving sources 2 have power enough to drive the total weight of the diaphragm 1 and the screen 5. The diaphragm 1 is driven by sixteen of the driving sources 2a and 2b. Each driving source comprises a magnetic circuit composed of a magnet 6, a top plate 7 and a bottom plate 8, and a voice coil 9 interposed in the magnetic gap of the magnetic circuit. The speaker system further has a cabinet 10 the interior of which is divided into closed sections and opened sections by a frame 11, an outer edge 12, an inner edge 13, a partition plate 14 and ports 15. A reference numeral 16 designates a video projector.

Figure 4:
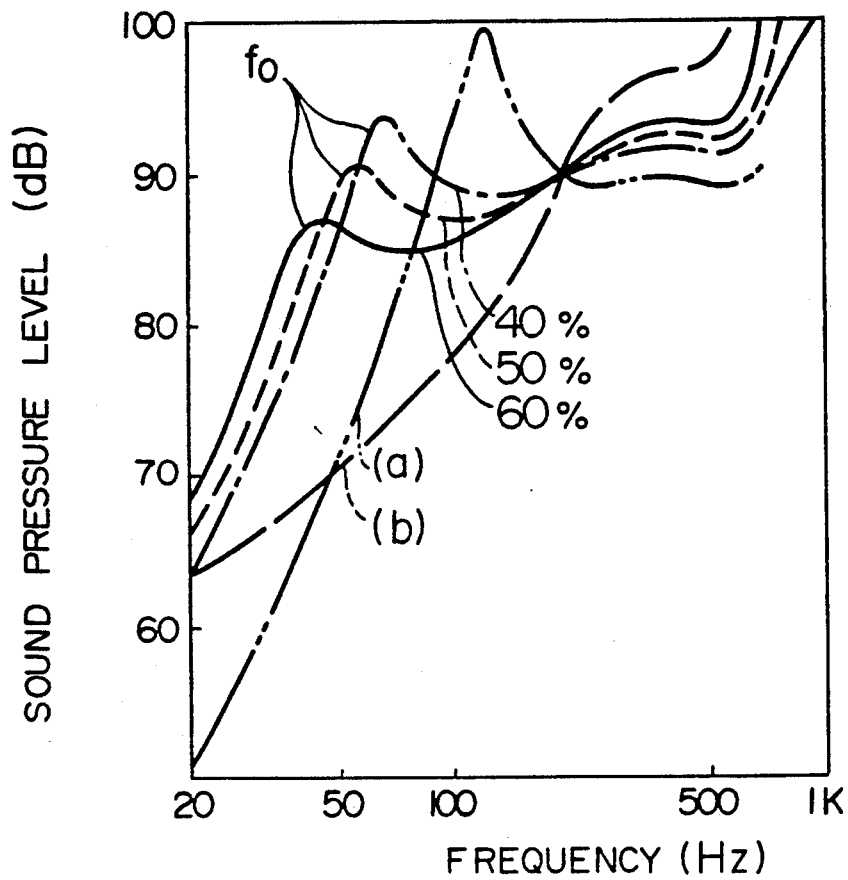
FIG. 4 is a diagram showing the sound pressure-frequency characteristic in relation to the ratio between closed area and opened area of the rear face of the diaphragm.

In operation, an image is projected by the video projector 16 onto the screen 5. The ratios or rates of the closed portions and the opened portions of the rear surface of the diaphragm 1 is determined by a required low-pitched sound characteristic. FIG. 4 shows how the sound pressure-frequency characteristic is influenced by the rate of the opened portion of the rear surface of the diaphragm 1. When the rate of the opened portions decreases, the stiffness of air in the closed portion is increased so that the minimum resonance frequency (referred to as $f_0$, hereinafter) is raised such that the reproduction level is reduced in the frequency region below the minimum resonance frequency $f_0$, while the level of reproduction in the frequency region above this minimum resonance frequency $f_0$ is increased. Conversely, when the rate of the opened area is increased, the cancelling interference between the sound waves emitted from the front side of the diaphragm 1 and the sound waves of inverse phase emitted from the rear side and diffracted around the diaphragm 1 is enhanced so that the reproduction level is reduced in the frequency region above the minimum frequency level $f_0$, whereas the reproduction level is increased in the frequency region below the minimum frequency level $f_0$. The amount of cancellation of the sound waves due to the diffraction of the sound depends on the amount of difference in the phase between the sound waves, i.e., the difference in distance. It is therefore possible to improve the cancelling interference between the sound waves by providing a port, i.e., the opened area, in the center of the rear surface of the diaphragm and by increasing the baffle area, i.e., the size of the screen 5. Anyway, the described arrangement in accordance with the first embodiment provides a remarkable improvement in the sound pressure of the reproduced sound in the low region as compared with the case where the whole rear surface of the diaphragm 1 is closed (FIG. 4(a) and the case where the whole rear surface of the diaphragm 1 is opened (FIG. 4(b)). It was also confirmed that the amplitude of the diaphragm was as small 0.3 mm during reproduction at a large sound capacity of 100 dB/m so that almost no oscillation of the image was observed even in the reproduction of powerful sounds.

Although in the described embodiment the screen 5 is adhered to the surface of the diaphragm 1, the arrangement may be such that the diaphragm itself has a surface which has been treated to function as a screen 5. It is also possible to use a diaphragm 1 with a curved surface in place of the planar screen 5. Such a diaphragm 1 provides a higher brightness of the image than the planar screen 5.

Figure 5:
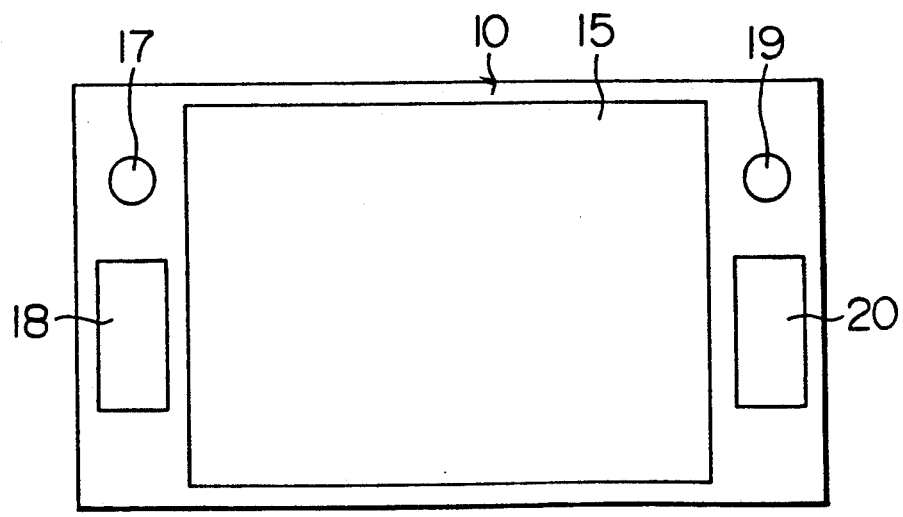
FIG. 5 is an illustration of a second embodiment of the speaker system in accordance with the present invention.

FIG. 5 schematically shows a second embodiment of the speaker system in accordance with the present invention.

Referring to this Figure, the speaker system has a cabinet 10, a screen 5 which is provided on the rear side with a speaker for low-pitched sound, a left-channel high-pitched sound speaker 17, a left-channel medium-pitched sound speaker 18, a right-channel high-pitched sound speaker 19 and a right-channel medium-pitched sound speaker 20 A video projector on the mid portion of the speaker system has been omitted from the drawings.

A description will be given hereunder as to the speaker system with a screen 5 having the described construction, with specific reference to FIG. 5. A low-pitched sound speaker employing a diaphragm of a large area and carrying the screen 5 on the surface thereof is disposed in the center of the cabinet 10 which has a large area and a reduced thickness as compared with those of the cabinets ordinarily used in this type of system. The low-pitched sound speaker may have a construction which is materially the same as that of the first embodiment This central low-pitched sound speaker is designed to operate with a monaural acoustic signal, because a stereo reproduction of sound in the low-pitched region does not cause any remarkable difference in the feeling of the sound from that of the monaural reproduction. In contrast, sounds of medium- and high-pitched regions have to be reproduced stereophonically, and this is the reason why the speaker system of the present invention employs high-pitched sound speakers 17, 19 and medium-pitched sound speakers 18, 20 for the left and right channels. In operation, an image is projected onto the screen 5 provided on the surface of the diaphragm of the low-pitched sound speaker so that the audience can simultaneously enjoy both a realism offered by the large-size image and a powerful reproduced sound rich in the low-pitched sound components. In the described embodiment, an imaging screen is provided on the acoustic diaphragm which has a size corresponding to 70 inch screen. The amplitude of the diaphragm during reproduction is as small as ±0.5 mm which is not greater than half the resolution of human eyes at normal distance from the screen so that the image quality is not impaired substantially by the vibration of the screen.

Thus, in the second embodiment of the invention, the central speaker for low-pitched sound is driven in monoral mode, while the medium- and high-pitched sounds are reproduced stereophonically by the respective speakers for the left and right channels, whereby the listener can enjoy Hi-Fi stereophonic sounds in medium-and high-pitched regions and powerful sound in a low-pitched region reproduced from the central speaker having a large diaphragm. Although in the described embodiment the medium- and high-pitched sound speakers are constructed integrally, such an arrangement is only illustrative and these speakers may be constructed as separate speaker units. It is also possible to provide additional medium-and high-pitched sound speakers on the upper and lower sides of the low-pitched sound speaker.

The reproduction system used in the second embodiment, in which the low-pitched sound is reproduced in monaural mode while medium- and high-pitched sounds are reproduced stereophonically, is known as a 3D system The 3D system, however, requires an amplifier which is used exclusively for the reproduction of the low-pitched sound region.

Figure 6A:
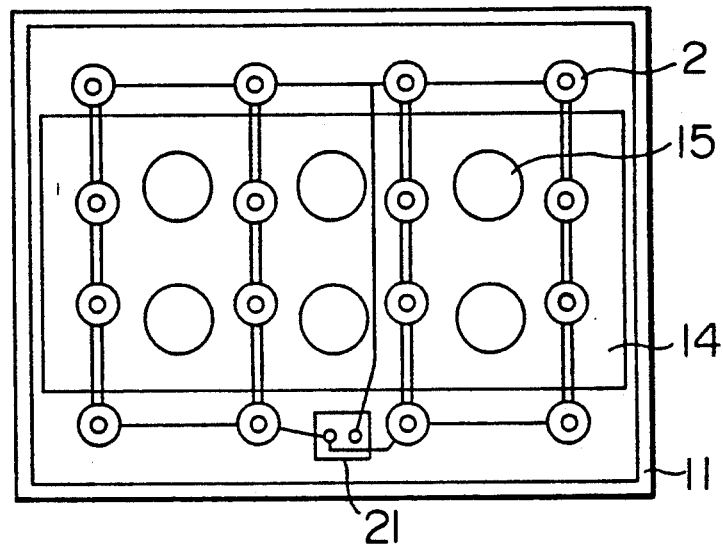
FIGS. 6a and 6b are illustration of a third embodiment of the speaker system in accordance with the present invention.
Figure 6B:
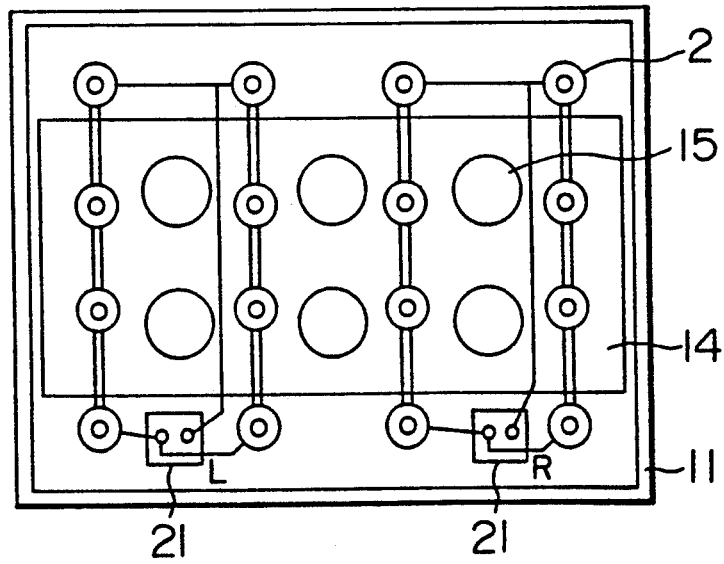

A description will be given of a third embodiment of the speaker system in accordance with the present invention. FIGS. 6a and 6b are front elevational views of a speaker system with a screen, having the same construction as that of the first embodiment, with the diaphragm removed therefrom In the known speaker system of the kind described, sixteen voice coils are connected in parallel and series to common input terminals 21, as shown in FIG. 6a. In contrast, the speaker system of the third embodiment of the present invention employs a different arrangement. Namely, sixteen voice coils are divided into two groups each including eight voice coils which are connected in parallel and series as illustrated. On the other hand, there are provided a pair of sets of terminal devices 21, 21 as illustrated. The parallel-series connection of eight voice coils of each group is connected to corresponding set 21 of input terminals 21 as illustrated. This arrangement allows an ordinary stereo-amplifier to be used, so that an additional amplifier which is necessitated in 3D system for the exclusive use in the reproduction of low-pitched sound can be eliminated.

In the case where an ordinary cone speaker having a single voice coil 9 is used in place of the multi-coil speaker shown in FIG. 6b, the arrangement may be such that a plurality of voice coils 9 are wound around a single common voice coil bobbin and are connected to different terminals.

In general, the low-pitched sound region has a wide directivity due to the large wavelength of the sound wave and, therefore, it is difficult to feel the direction in which the sound source propagates Therefore, the stereophonic effect is not materially impaired even in the 3D system in which the sound of low-pitched region is reproduced in monaural mode, while sounds of medium-and high-pitched regions are reproduced stereophonically. However, some of digital sources currently used include an appreciable difference of level between the left and the right sides so that stereophonic sound reproduction is preferably used also in the reproduction of low-pitched sounds.

The 3D system conventionally used cannot comply with such a demand. Another problem is that, when the diaphragm of the speaker for reproducing low-pitched sound is divided into two halves, i.e., a half for the left channel and a half for the right channel, the image on the screen is unfavorably affected because the screen is divided into two sections at the mid portion thereof.

Figure 7:
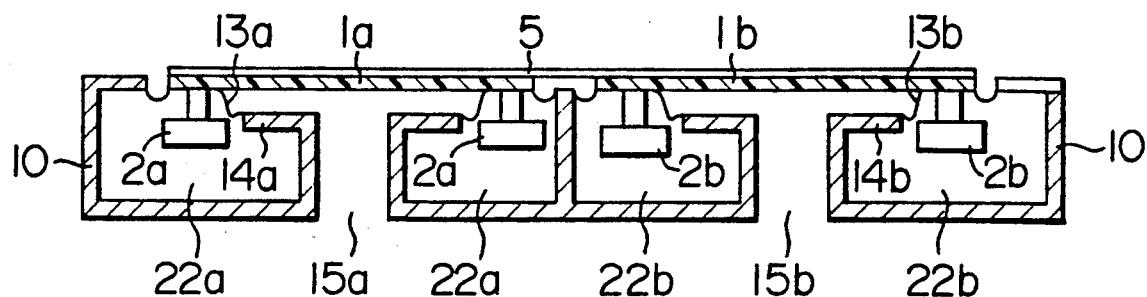
FIG. 7 is an illustration of a fourth embodiment of the speaker system in accordance with the present invention.

FIG. 7 shows in section an essential portion of a speaker in accordance with a fourth embodiment of the present invention. This embodiment employs a pair of diaphragms 1a and 1b each having a size of 1,067mm×700 mm. These diaphragms 1a and 1b are adapted to be driven independently by driving signals derived from the respective driving units 2a and 2b. These diaphragms 1a and 1b are covered at their rear with respective closing cabinets 22a and 22b. These cabinets 22a and 22b have central opened areas which are defined and separated from the closed areas by inner edges 13a, 13b, partition plates 14a, 14b and ports 15a, 15b as in the preceding embodiments. This speaker system can have a reduced thickness but yet be capable of reproducing low-pitched sounds with a good quality as in the cases of the preceding embodiments.

Figure 8:
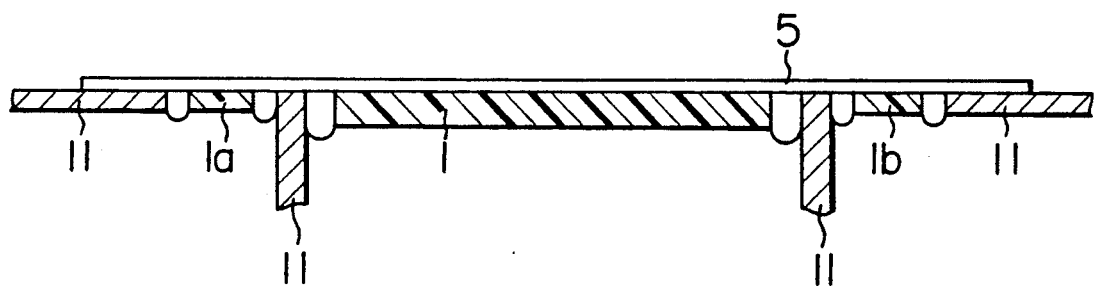
FIG. 8 is a sectional view illustrative of the diaphragm and a construction for securing a diaphragm to the frame of the speaker system of the fourth embodiment of the present invention.

An imaging screen of 70 inch size (1,067 mm×1,422 mm) is adhered to the surfaces of the diaphragms 1a and 1b without any seam so that the image on the screen as viewed from the front side is not materially affected. The screen 5 is made of an elastic material such as polyvinylchloride and has a large vibration area. The screen 5 therefore can vibrate without being affected by the difference in the vibration between two diaphragms 1a and 1b, and the vibration amplitude of the screen 5 is as small as 0.3 mm when the sound pressure level of the reproduced sound is 100 dB/m. Thus, stereophonic reproduction of low-pitched sound can be accomplished with diaphragms which are seemingly in one piece. As shown in FIG. 8, the screen may be provided integrally with the surface of a single low-pitched sound diaphragm 1 and medium- and high-pitch sound diaphragms 1a, 1b or with the surface of a frame 11 which supports these diaphragms. The diaphragm 1 used in this embodiment can have a curved surface although a planar diaphragm 1 is shown.

Figure 9:
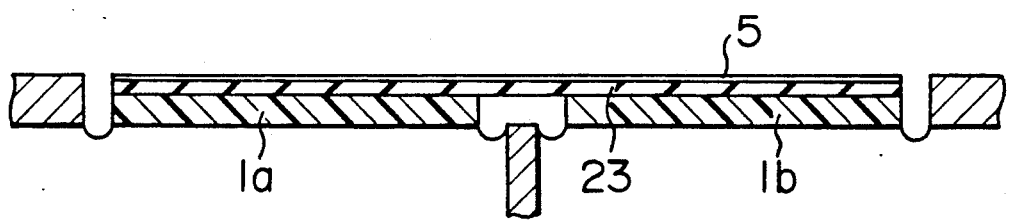
FIG. 9 is a sectional view illustrative of the diaphragm and a construction for securing the diaphragm to the frame of a fifth embodiment of the present invention.

A fifth embodiment of the speaker system in accordance with the present invention will be described hereunder with reference to the drawings, particularly to FIG. 9 which shows diaphragms 1a and 1b used in the fifth embodiment and a construction for securing the diaphragms 1a and 1b to the frame 11 in the fifth embodiment. Other portions are materially the same as those in the third embodiments. Referring to FIG. 9, the fifth embodiment of the speaker system has diaphragms 1a, 1b, an elastic sheet 23 having a thickness of 2 mm and made of a rubber such as a foamed rubber (weight about 700 gr) and a screen 5. In the fourth embodiment described in the foregoing, the screen 5 has a thickness which is as small as 0.5 mm so that the screen 5 tends to exhibit steps at the seam between two adjacent diaphragms or at the marginal edges of the diaphragms. In the fifth embodiment, such steps are eliminated by virtue of the thick rubber or elastic sheet 23 interposed between the diaphragms 1a, 1b and the screen 5, so that any unfavorable effect which might be caused by such steps can be eliminated. The elastic sheet 23 placed between the diaphragms 1a, 1b and the screen 5 may be of other materials than rubber. For instance, any suitable material having elasticity such as a plastic or a foamed plastic can be used as the material of the elastic sheet 23 placed between the diaphragms 1a and 1b and the screen 5.

Figure 10:
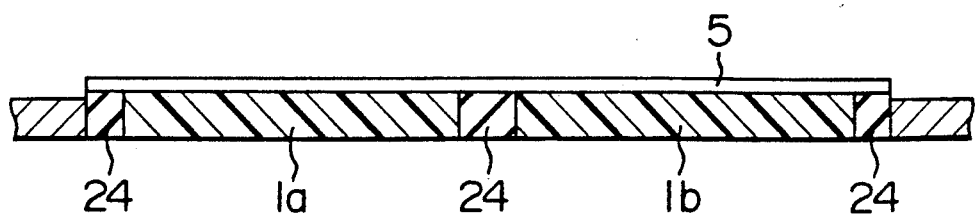
FIG. 10 is a sectional view illustrative of the diaphragm and a construction for securing the diaphragm to the frame of a sixth embodiment of the present invention.

A description will be given hereinunder of the sixth embodiment of the present invention with reference to FIG. 10 which is a sectional view illustrating diaphragms 1a and 1b used in this embodiment and a construction for securing such a diaphragm to the frame 11. Other portions are materially the same as those in the third embodiment. Referring to this figure, the sixth embodiment of the speaker system in accordance with the present invention has diaphragms 1a, 1b, elastic members 24 and a screen 5. More specifically, elastic members 24, which may be of an elastic adhesive of room-temperature curing type silicon rubber, are placed between two diaphragms 1a, 1b and between these diaphragms 1a, 1b and the frame 11. The surface of the elastic member 24 between two diaphragms 1a and 1b is flush with the surfaces of the diaphragms 1a, 1b. Since the amplitude of vibration of the diaphragms 1a and 1b are very small as explained before, it is not necessary to employ a roll edge suitable for vibration at large amplitude as used in the third and fourth embodiments. Thus, the sixth embodiment can provide satisfactorily high sound pressure level, as well as low distortion of sound, with the use of a jointing method as described above. It is also to be pointed out that the fifth embodiment described before involves a problem in that the screen 5 tends to slacken in the region between two diaphragms 1a and 1b so that a support member of a considerable thickness and rigidity has to be placed in the gap between two diaphragms 1a and 1b so as to support the screen 5. In the sixth embodiment, the elastic member 24 placed between two diaphragms 1a, 1b has a surface which is flush with the surfaces of the diaphragms 1a, 1b so as to eliminate any height step or gap between the two diaphragms 1a and 1b. Therefore, any tendency for the screen 5 to slack or to exhibit a step is eliminated even when the screen 5 has a very small thickness and directly adhered to the diaphragms 1a and 1b. If a very small step is inevitable due to, for example, in the error incurred during the bonding, any unfavorable effect caused by such a small step can be eliminated by an elastic sheet such as a rubber or elastic sheet 23 as used in the fifth embodiment. In such a case, the elastic sheet 23 can have a very small thickness corresponding to the very small height of the step. In consequence, the weight or the mass of the vibrating body is not substantially increased. The connection between each diaphragm and the frame 11 may be accomplished by conventional roll-edge type construction without using any elastic intermediate member. Although an elastic adhesive is used as the material of the elastic member or sheet 23 in this embodiment, the elastic member may be made from other suitable materials such as, for example, a soft urethane foam.

As will be understood from the foregoing description, the present invention offers the following advantages:

(1) It is possible to conduct stereophonic reproduction in low-pitched sound region, while eliminating any unfavorable effect on the image displayed on the screen 5 such as distortion of the image attributable, for example, to a seam in the screen 5.

(2) A large diaphragm 1 which can hold a large screen 5 can easily be formed by assembling a plurality of small diaphragms 1a and 1b, so that the production cost can be reduced remarkably as compared with the case where an integral large diaphragm 1 is employed.

(3) There has been a problem that a diaphragm 1 having a large area corresponding to the large screen area essentially requires that the thickness of the diaphragm has to be increased so as to maintain a sufficiently high level of rigidity of the diaphragm 1. This inevitably increases the weight of the diaphragm 1 to adversely affect the reproduction characteristic. In contrast, the speaker system of the present invention which has a diaphragm composed of a plurality of small diaphragm elements 1a and 1b can have a reduced weight because each diaphragm element can have sufficiently high level of rigidity by virtue of its small size.

(4) The screen 5 is evenly supported by an elastic member 24 which overlies the plurality of diaphragms 1a and 1b and the gap between these diaphragms so as to provide a smooth supporting surface, whereby deformation such as a slack of the screen 5 can be eliminated.

(5) The screen 5 is evenly supported by a plurality of diaphragms 1a and 1b and an elastic sheet 23 which fills the gap between the diaphragms 1a and 1b so that undesirable deformation such as slacking of the screen 5 can be eliminated while the weight of the diaphragms 1a and 1b is decreased.

The speaker system of the first embodiment has a problem in that the frequency characteristic of the speaker system thereof significantly varies according to the condition of installation of the speaker system, i.e., whether the speaker system hangs from a wall or spaced away from a wall.

The reason of this variation in the frequency characteristic will be described with reference to FIGS. 11a and 11b.

Figure 11A:
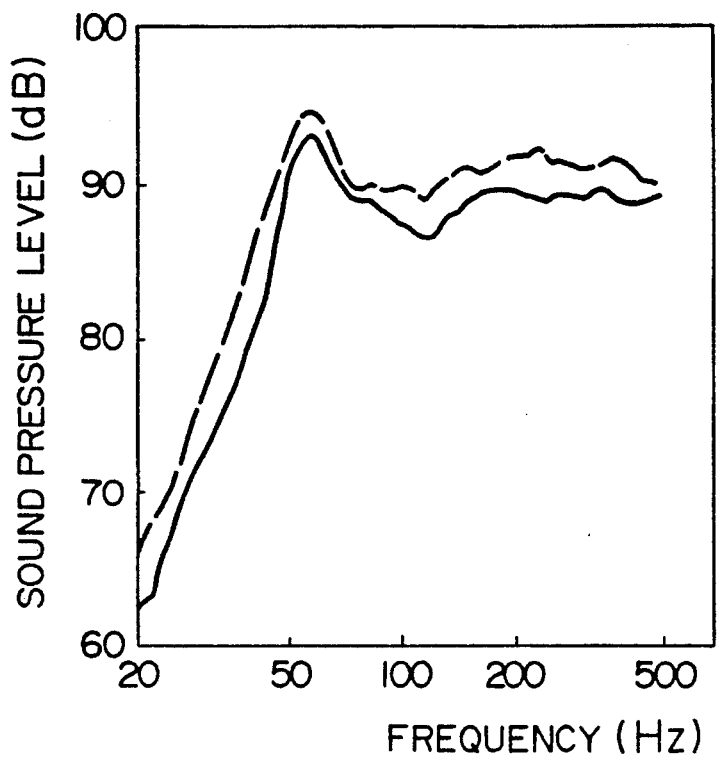
FIGS. 11a and 11b are diagram illustrating variation of the sound pressure-frequency characteristic according to a variation in the speaker system in accordance with the present invention.
Figure 11B:
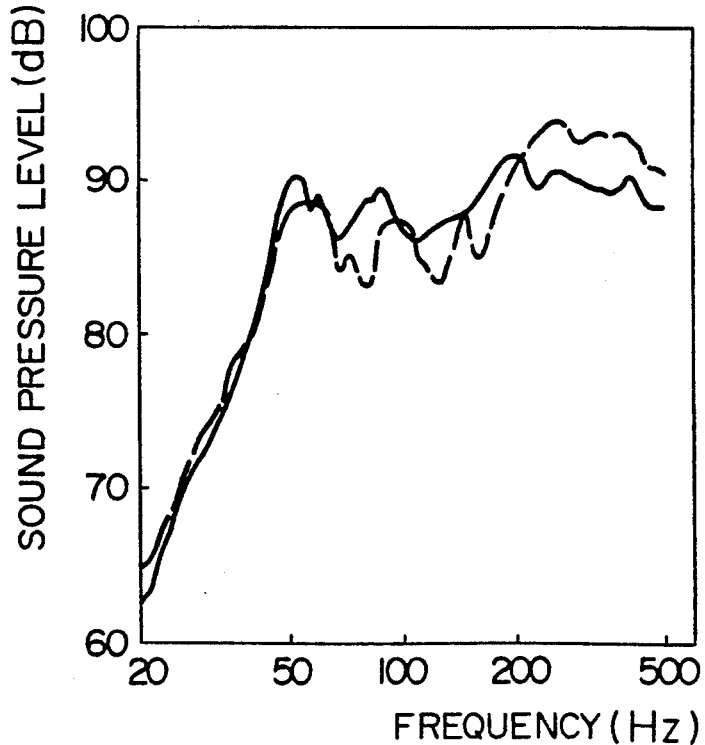

FIGS. 11a shows the frequency characteristic as observed when a speaker system having a diaphragm of 0.8×0.3 m placed in a cabinet of 1 m×1 m is placed in a free space, while FIG. 11b illustrates the case where the same speaker system is put on a wall. In each Figure, the solid line curve shows the characteristic obtained when the ratio of the opening area to the whole area of the rear side of the diaphragm is 43%, while a broken line curve shows the characteristic obtained when the ratio is 65%. In order to obtain the same level of the minimum resonance frequency $f_0$ in both cases, the weight or mass of the vibration systems is varied. Namely, the weight of the vibration system is selected to be 1,400 gr in the case where the opening area ratio is 43%, whereas the weight of the vibration system in determined to be 780 gr in the case where the opening ratio is 65%. Therefore, the speaker system having the opening area ratio of 65% provides a higher level of sound pressure than that produced by the speaker system having the opening area ratio of 43% when the speaker system is placed in free space. On the contrary, when the speaker system is put on the wall, the speaker system having the opening area ratio of 43% provides a higher level of sound pressure than the speaker system having the opening area ratio of 65%. This is attributable to the following fact. Namely, when the speaker system is put on the wall, almost all portions of the sound waves of inverse phase produced by the rear surface of the diaphragm is diffracted back to the front side of the speaker through the gap between the wall and the cabinet so as to cause a large amount of cancelling interference with the sound wave emitted from the front surface of the diaphragm. In contrast, when the speaker is placed in a free space away from the wall, only a small portion of the sound waves of the inverse phase emitted from the rear side of the diaphragm are diffracted to the front side. In addition, a phase difference is produced due to a comparatively large mean length of the paths of sound as compared with the case where the speaker system is used in contact with the wall.

It is understood from this fact that, in order to obtain a high level of sound pressure of the reproduced sound, the opening area ratio is preferably made small if the speaker system is used on the wall, whereas, if the speaker system is intended for use in a free space, the opening area ratio is preferably large for the purpose.

In the described embodiments, the ratio of the opening area on the rear side of the diaphragm is fixed by the design of the cabinet, so that it is impossible to vary the characteristic depending on the condition of use of the speaker system.

Figure 12A:
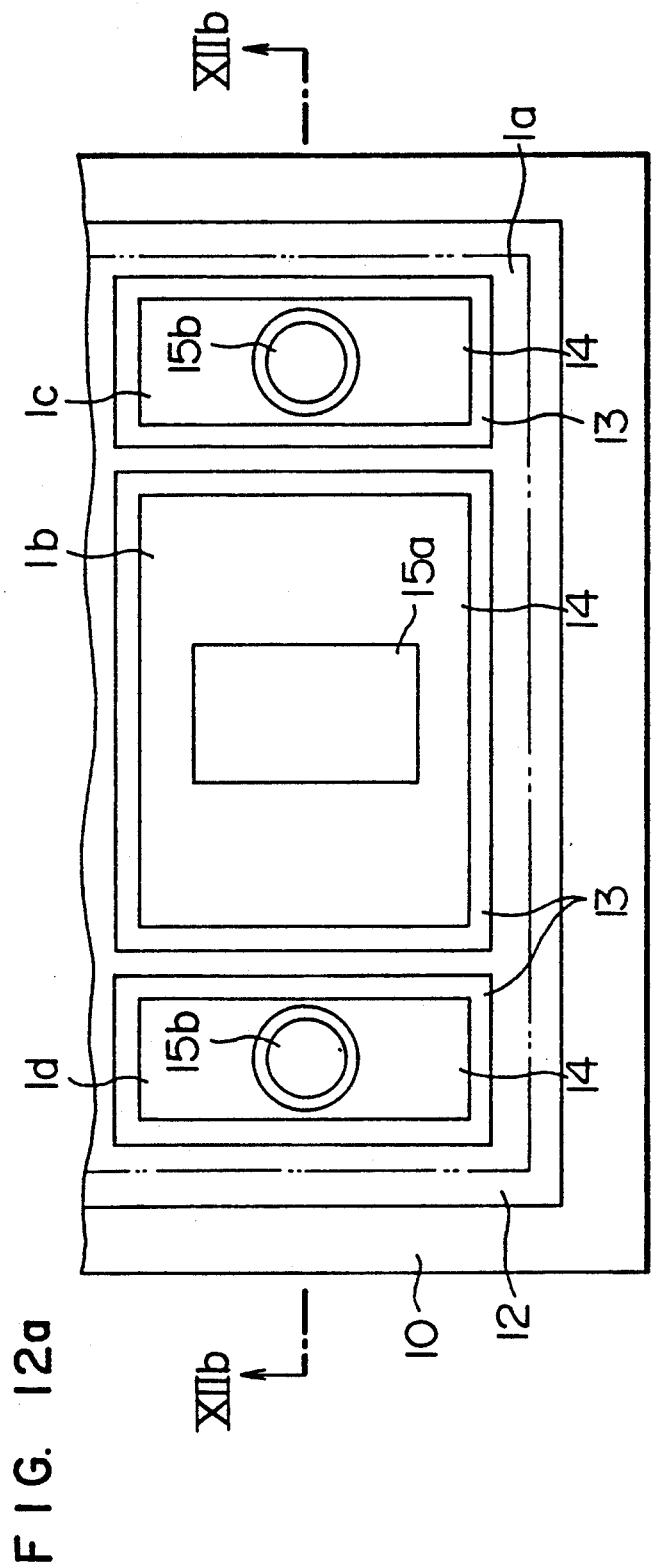
FIGS. 12a and 12b are illustration of a seventh embodiment of the speaker system in accordance with the present invention.
Figure 12B:
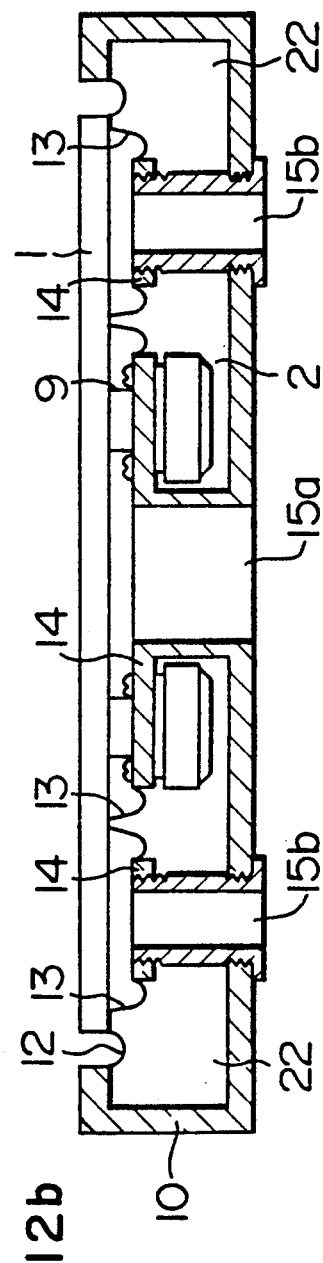

FIGS. 12a and 12b show the construction of an essential portion of a seventh embodiment of the speaker system in accordance with the present invention. More specifically, FIG. 12a is a plan view of the essential portion, while FIG. 12b is a sectional view taken along the line XIIb—XIIb. In FIG. 12a, the diaphragm has been omitted for the purpose of clarification of the drawings. Referring to these Figures, a planar diaphragm 1 having a size corresponding to 70-inch screen (1,422 mm×1,067 mm) and a thickness of 20 mm is secured to a cabinet 10 having a wall thickness of 10 cm by rolling at outer edge 12 so that a closed space 22 is formed on the peripheral portion 1a of the rear surface of the diaphragm 1.

Figure 13:
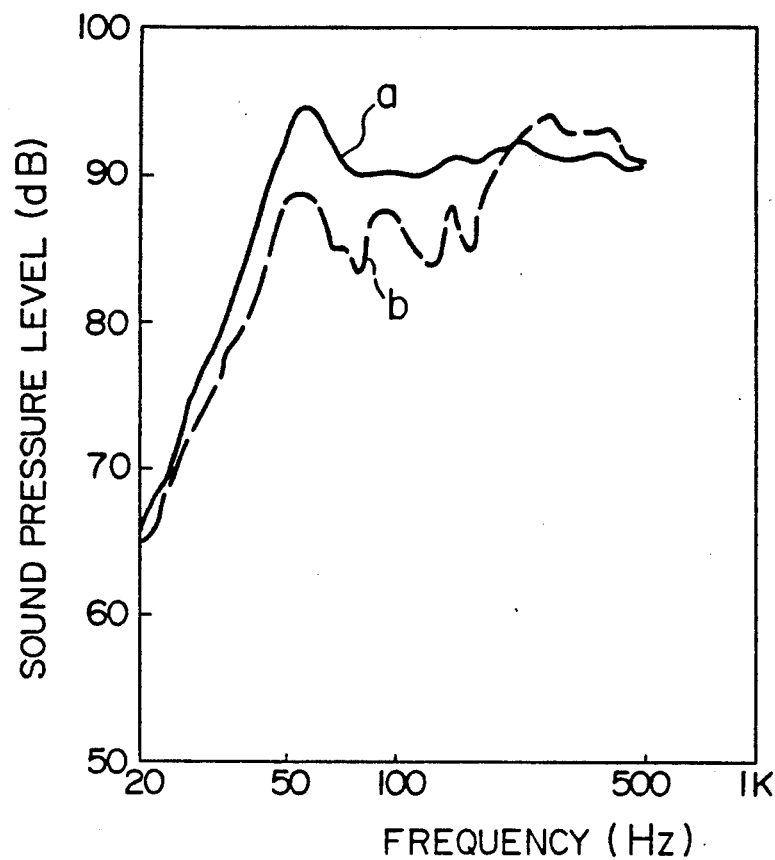
FIG. 13 is a diagram illustrating variation of the sound pressure-frequency characteristic in the seventh embodiment.
Figure 14:
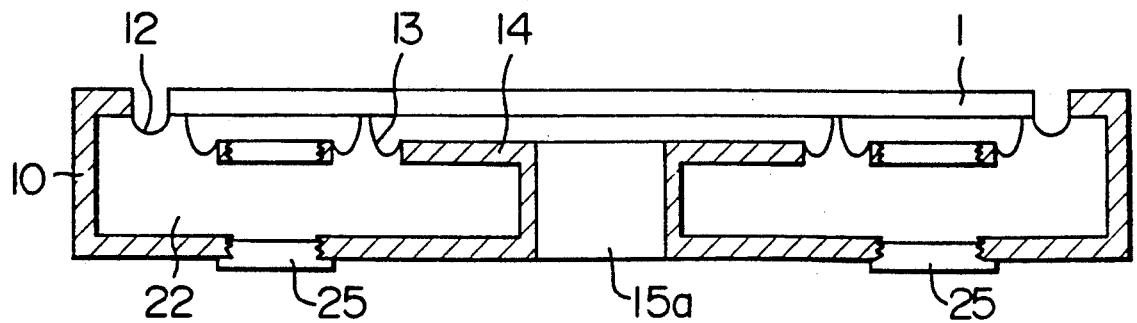
FIG. 14 is an illustration of a modification of the seventh embodiment in which the rates of the closed portion and opened portion of the rear surface of the diaphragm are changed.

The diaphragm 1 is composed of three diaphragm elements 1b, 1c and 1d so that the central region of the diaphragm 1 is divided into three sections. These three sections are separated from the closed space 22 the respective partition plates 14, inner edges 13 and ports 15a, 15b. Thus, the cabinet defines open spaces corresponding to these sections of the diaphragm 1. The left and right ports 15b are detachably secured to the cabinet 10 by being screwed into a back plate and an intermediate plate of the cabinet 10. The area of the portion of the diaphragm 1 covered by the closed space 22 occupies 35% of the effective vibration area of the diaphragm. The central opened area and each of the left and right opened areas of the diaphragm occupy 45% and 10%, respectively. In order to examine the frequency characteristic of this speaker system in a free space, a test was conducted by operating this speaker system in a free space within an echo-less room, the results of which are shown in FIG. 13(a). Another test was conducted by hanging the speaker system from a wall such that a gap of 2 cm is formed between the rear surface of the cabinet 10 and the wall surface, the results of which are shown in FIG. 13(b). It will be seen from curve b of FIG. 13 that, when the speaker system is used on the wall, the sound pressure level is significantly reduced at the frequency region below 200 Hz due to the fact that most of the sound waves emitted from the rear surface of the diaphragm are diffracted back to the front side of the diaphragm so as to cancel the sound waves emitted from the front side of the diaphragm.

A test also was conducted by using the same speaker system, except that the left and right ports have been demounted with the resultant openings in the cabinet closed by cover members 25 so that the opened area of the diaphragm to the whole effective vibration area of the same has been reduced to 45%. This speaker system is made to hang from the wall and the frequency characteristic was measured, the results of which are shown in curve b of FIG. 15. It will be seen that the minimum resonance frequency $f_0$ has been raised due to an increase in the stiffness of air in the cabinet 10 corresponding to an increase in the closed area, but the level of the sound pressure has been raised appreciably as compared with the case where the rate of the opening area is 65%.

The measurement was conducted with the same speaker system under the same condition except that the size of the gap between the rear surface of the cabinet 10 and the wall surface was reduced to 1 cm, the results of which are shown in curve c of FIG. 15. From this Figure, it will be seen that the level of the sound pressure was decreased, as was the minimum resonance frequency $f_0$. This is attributable to the fact that the air in the gap between the rear surface of the cabinet 10 and the wall surface acts as an acoustic vibration mass so as to produce an effect which is the same as that produced by an increment of the weight of the diaphragm.

Thus, the seventh embodiment having detachable ports 15b can provide variable frequency characteristics depending on the condition of use of the speaker system. Namely, when the speaker system is used as wall hang-on type speaker, the ports 15b are removed from the cabinet and the resultant openings are closed by cover members 25 so as to reduce the ratio of the opening area to the whole effective vibration area, whereas, when the speaker system is used in free space away from wall, the rate of the opened area is increased, whereby a sufficiently high level of sound pressure can be obtained over a wide range of frequencies regardless of a change in the condition of use.

Figure 16A:
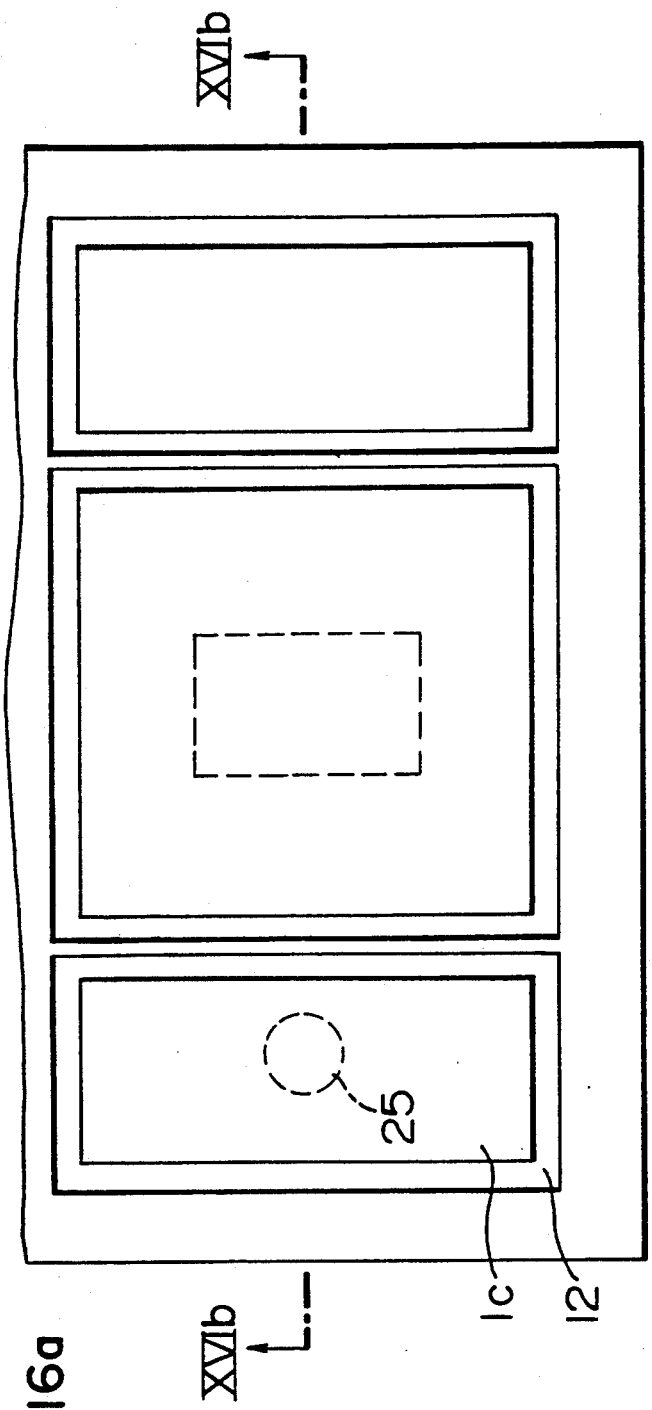
FIGS. 16a and 16b are illustration of an eighth embodiment of the speaker system in accordance with the present invention.
Figure 16B:
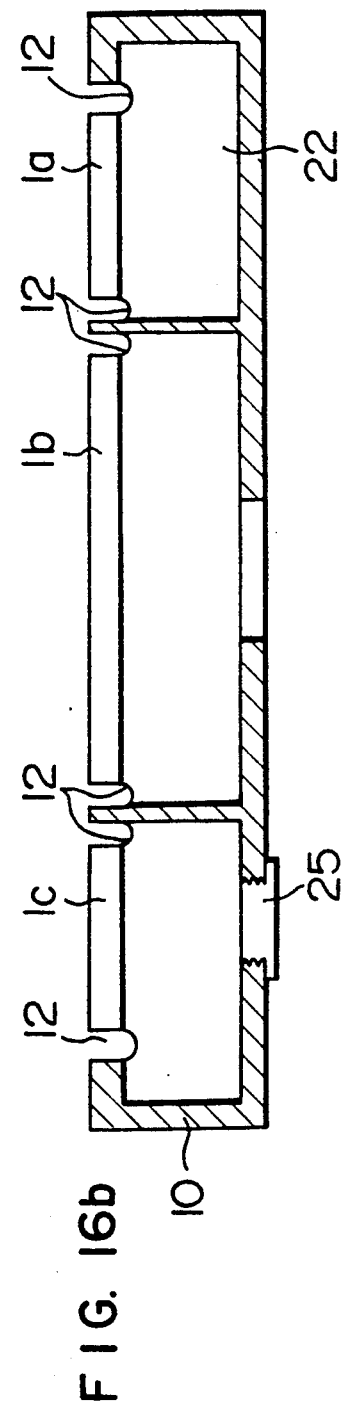

An eighth embodiment of the present invention will be described with reference to FIGS. 16a and 16b which are a front elevational view of an essential portion of the eighth embodiment and a sectional view taken along the line XVIb—XVIb of FIG. 16a. Driving units for driving the speakers are omitted from these figures. This embodiment of the speaker system has diaphragms 1a to 1c. A closed cabinet 10 is formed on the rear side of the diaphragm 1a, while an opened cabinet 10 is provided on the rear side of the diaphragm 1b. A cabinet 10 provided on the rear side of the diaphragm 1c is provided with a removable cover member 25, so that this cabinet 10 functions selectively both as a closed cabinet and an opened cabinet. Namely, this cabinet 10 acts as a closed cabinet 10 when an opening in the rear wall of this cabinet 10 is closed by the removable cover member 25.

In the embodiment shown in FIG. 7 described before, a single large diaphragm 1 is used and divided into a plurality of sections some of which are covered by closed cabinets while the remainder is backed by an opened cabinet. Thus, different sections of the single diaphragm 1 receive different levels of load so that stress concentration inevitably occurs in the boundary regions between the adjacent sections, with the result that a strain of the single diaphragm 1 is caused to generate peaks and dips in the sound pressure-frequency characteristics of the speaker system. This problem, however, is overcome by the speaker system of the eighth embodiment in which the diaphragm is composed of a plurality of diaphragm elements which are backed by independent opened or closed cabinets and which are driven by independent voice coils 9. Thus, in the eighth embodiment of the present invention, the level of strain is lowered and the local peaks and dips in the frequency characteristic are eliminated to provide an even frequency characteristic. In addition, since each diaphragm element has a considerably small size, the minimum resonance frequency level is elevated so as to provide an expanded piston vibration band. Furthermore, the assembly of the speaker system is facilitated because the complicated internal structures such as partition plates 14 and inner edges can be dispensed with. In the seventh and eighth embodiments of the speaker system according to the present invention, the ratio of the opening area of the diaphragm 1 to the whole effective vibration area of the diaphragm 1 is variable depending on the condition of installation of the speaker system. These embodiments, however, suffer from a problem in that they require cabinets with complicated internal structures. Another problem is that the acoustic impedance distribution on the rear side of the diaphragm 1 and, hence, the vibration mode, are undesirably changed when the ratio of the opening area to the whole effective vibration area is varied. In order to optimize the sound pressure level-frequency characteristic of the speaker system, therefore, it is necessary to vary also the driving position.

Figure 17A:
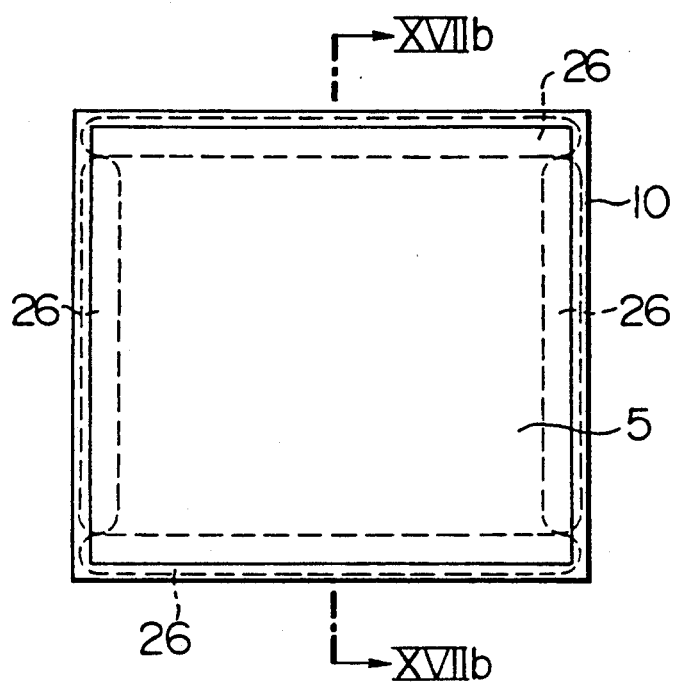
FIGS. 17a and 17b are illustration of the ninth embodiment of the speaker system in accordance with the present invention.
Figure 17B:
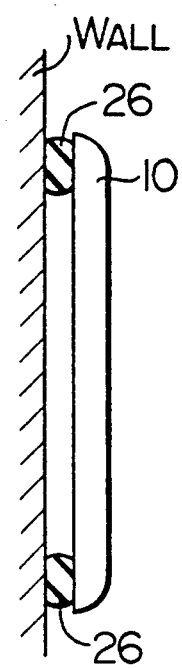

These problems, however, can be overcome by a ninth embodiment of the present invention which will be described hereinunder with reference to FIGS. 17a and 17b which are a front elevational view and a side elevational view of the ninth embodiment. This embodiment employs a sound absorbing member 26 which fills the gap between the rear surface of the cabinet and the wall from which the speaker system hangs.

Figure 18:
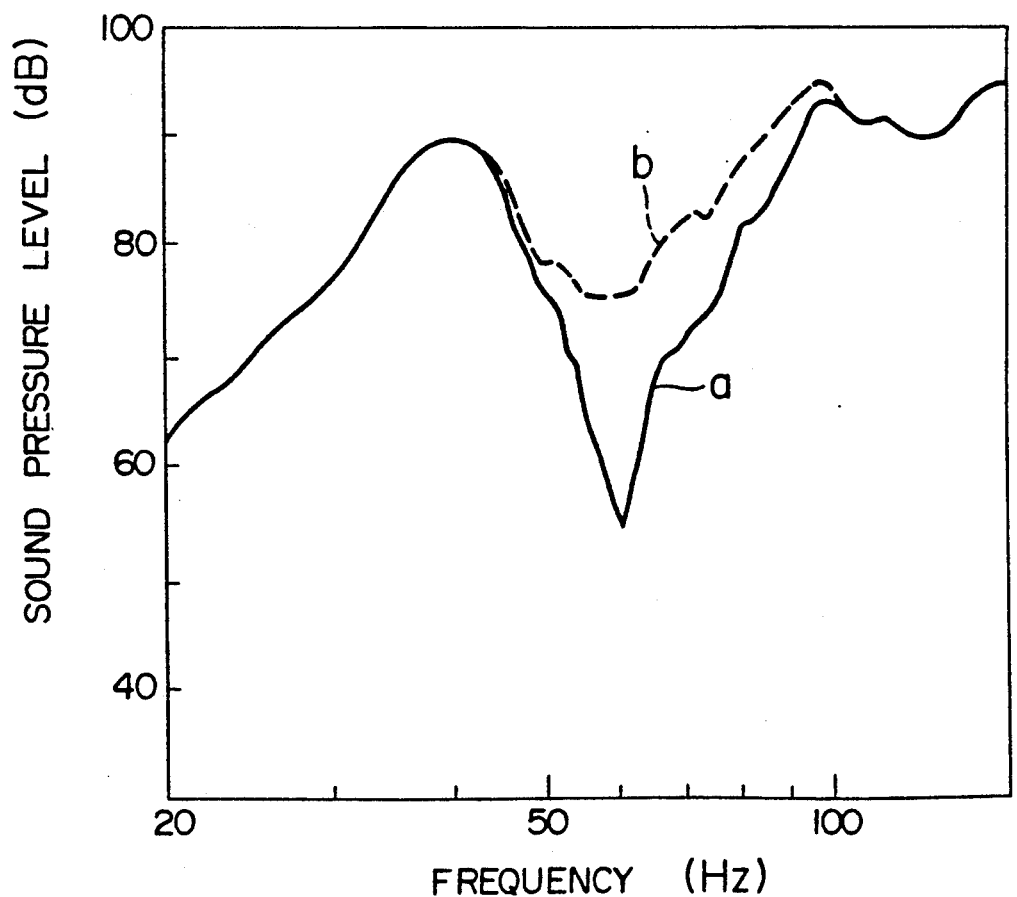
FIG. 18 is a chart showing the sound pressure characteristic of the ninth embodiment as observed when a sound absorbing material is adhered to the rear surface of the diaphragm and when there is no sound absorbing member adhered to the rear surface of the diaphragm.

FIG. 18 illustrates how the sound pressure-frequency characteristic is influenced by the presence or absence of the sound absorbing member 26. It will be seen that large peaks and dips of a curve (a) presented when the sound absorbing member 26 is omitted can be reduced by the provision of the sound absorbing member 26 as represented by a curve (b). This is understood to be attributable to a fact that the sound wave emitted from the rear side of the diaphragm 1 is effectively absorbed by the sound absorbing member 26 so as to reduce the proportion of the sound wave which is diffracted around the diaphragm 1 to the front side of the speaker. Thus, the sound absorbing member 26 appreciably reduces the unfavorable effect which is caused when the speaker system is used as a hang-on type speaker.

Figure 19:
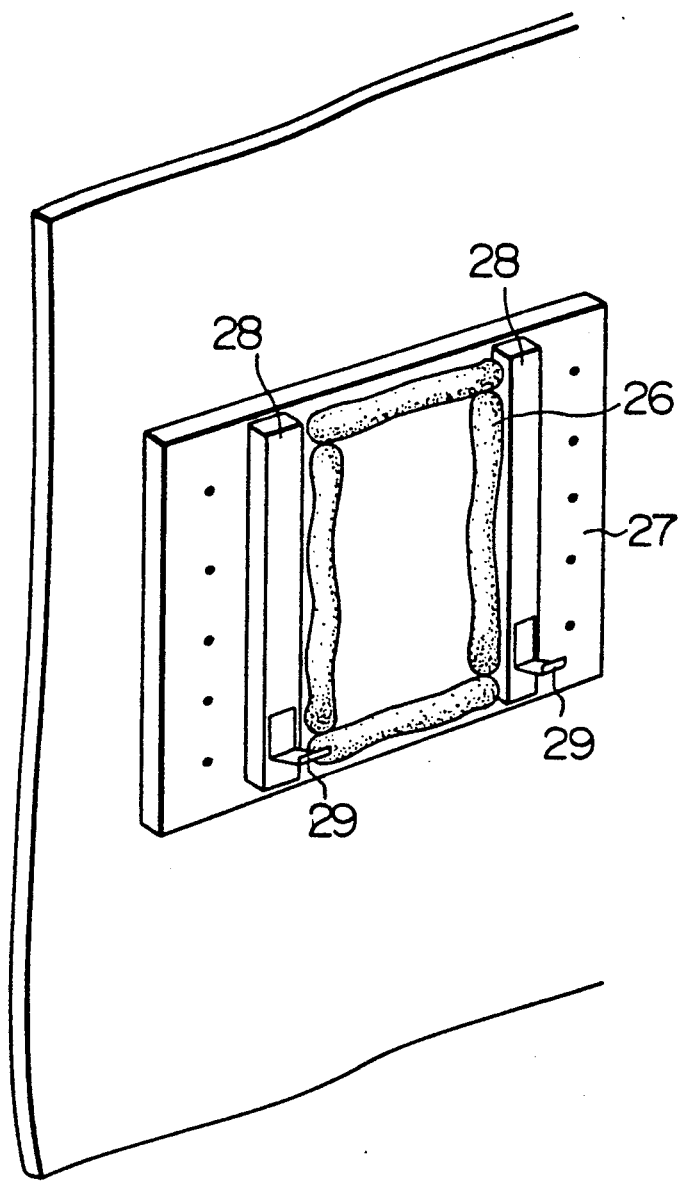
FIG. 19 is an illustration of the 10th embodiment of the present invention.

A tenth embodiment of the present invention will be described hereinunder with reference to the drawings, particularly to FIG. 19. Referring to this figure, there is shown a speaker system which has a sound-shielding plywood sheet 27 of 20 mm thick, posts 28 made of aluminum pipes secured to the plywood sheet 27 and brackets 29 which are attached to the posts 28. A reference numeral 26 denotes a layer of a sound absorbing member which is 100 mm in width and 30 mm in thickness. These members 27 to 29 in cooperation provide a wall adapter which can be fixed to a wall 30 by means of, for examples, screws. A speaker system with an image screen incorporated integrally therewith and having a 70-inch screen surface, has a large weight which well exceeds 70 kg. It is dangerous to attach such a heavy unit to a wall of an ordinary house. In addition, the acoustic characteristic is significantly changed by a variation in the distance between the wall surface and the rear surface of the cabinet 10 of the speaker system. The wall adapter shown in FIG. 19 enables the distance between the rear surface of the cabinet 10 and the surface of the wall 30 to be determined precisely and makes it possible to set the sound absorbing member 26 in good condition. It is also possible to attach a sound- and/or vibration-insulating material on the surface of the wall 30 so as to prevent sound and vibration from being transmitted to the exterior of the room or to the next room.

We claim:

1. A speaker system comprising:
   an acoustic diaphragm having a front surface and a rear surface, said front surface carrying an image projection screen thereon;
   a driving unit provided on said rear surface of said diaphragm, for driving said diaphragm; and
   a cabinet provided on said rear surface of said diaphragm and defining an open space and a closed space therein so as to expose a part of said rear surface of said diaphragm to said open space and to enclose the other part of said rear surface of said diaphragm within said closed space.

2. A speaker system according to claim 1, wherein said driving unit includes a plurality of driving elements and a plurality of sets of input terminals, each of said sets of input terminals being connected to at least one of said driving elements.

3. A speaker system according to claim 1, wherein said driving unit includes a plurality of driving elements each having a voice coil bobbin, a voice coil wound around said voice coil bobbin, and a plurality of input terminals for supplying independent driving signals to each said voice coil bobbin.

4. A speaker system according to claim 1, wherein said diaphragm includes a plurality of diaphragm elements which can vibrate independently of each other and wherein said screen is integrally incorporated with the surfaces of said diaphragm elements.

5. A speaker system according to claim 1, wherein said diaphragm includes a plurality of diaphragm elements which can vibrate independently of each other, and wherein said screen is incorporated integrally with a surface of an elastic sheet which is attached to the surfaces of said diaphragm elements.

6. A speaker system according to claim 1, wherein said diaphragm is composed of a plurality of diaphragm elements which can vibrate independently of each other, said speaker system further comprising an elastic member placed in the gap between adjacent diaphragm elements and having surfaces flush with the surfaces of said diaphragm elements, said screen being integrally incorporated with the surfaces of said diaphragm elements and said elastic member.

7. A speaker system according to claim 6, said acoustic diaphragm having a frame-supporting peripheral portion, wherein said screen is also incorporated integrally with said frame-supporting peripheral portion of said acoustic diaphragm.

8. A speaker system according to claim 1, further comprising a sound absorbing member interposed between a rear surface of said cabinet and the surface of a wall adjacent to said cabinet.

9. A speaker system according to claim 8, wherein said cabinet has an outer peripheral portion and said sound absorbing member is disposed along at least a part of said outer peripheral portion of said rear surface of said cabinet.

10. A speaker system according to claim 1, further comprising a sound insulating plate attached to said cabinet, a mounting member capable of maintaining a predetermined gap between a rear surface of said cabinet and a surface of said sound insulating plate, and a sound absorbing member secured to one of said sound insulating plate, said mounting member, and the rear surface of said cabinet.

11. A speaker system, comprising:
an acoustic diaphragm assembly having a front surface and a rear surface, said front surface carrying an image projection screen thereon;
a driving unit provided on said rear surface of said acoustic diaphragm assembly, for driving said acoustic diaphragm assembly; and
a cabinet provided on said rear surface of said acoustic diaphragm assembly and defining an open space and a closed space therein so as to expose a part of said rear surface of said diaphragm to said open space and to enclose the other part of said rear surface of said diaphragm within said closed space;
wherein said acoustic diaphragm assembly provided on the front surface with said screen includes first, second, and third diaphragms, said first and second diaphragms having formed on their rear surface a closed cabinet portion and an opened cabinet portion, while said third diaphragm is formed on its rear surface with a cabinet portion which can be selectively closed and opened so as to respectively form another closed cabinet portion and another opened cabinet portion, said close cabinet and said three kinds of cabinet portions being incorporated integrally with one another.

12. A speaker system according to claim 11, wherein said cabinet portion which can be selectively closed and opened is formed in said closed cabinet by a partition plate which is spaced by a predetermined distance from said third section of said rear surface of said third diaphragm, an inner edge portion which interconnects between said partition plate and the circumference of said rear surface of said third diaphragm, an opening formed in said partition plate, an opening provided in the rear wall of said cabinet, a port for interconnecting both said openings, and a cover member which can be attached in said port, such that, when said cover member is attached in said port said selectively usable cabinet portion is used as a closed cabinet portion.

13. A speaker system comprising:
an acoustic diaphragm assembly having a front surface and a rear surface, said front surface carrying an image projection screen thereon;
a driving unit provided on said rear surface of said acoustic diaphragm assembly, for driving said acoustic diaphragm assembly; and
a cabinet provided on said rear surface of said acoustic diaphragm assembly and defining an open space and a closed space therein so as to expose a part of said rear surface of said diaphragm to said open space and to enclose the other part of said rear surface of said diaphragm within said closed space;
wherein said acoustic diaphragm assembly includes at least separate first, second and third diaphragms on the surface of which said screen is attached integrally, a first closed cabinet portion provided on the rear side of said first diaphragm element, an opened cabinet portion provided on the rear side of said second diaphragm element, and a cabinet portion which can selectively be used as both a closed cabinet portion and an opened cabinet portion, said closed cabinet portion, said opened cabinet portion and said cabinet portion which is selectively usable as both a closed cabinet portion and an opened cabinet portion being incorporated integrally with one another.

14. A speaker system comprising:
an acoustic diaphragm having a front surface and a rear surface, said front surface carrying an image projection screen thereon;
a driving unit disposed on said rear surface of said diaphragm for driving said diaphragm; and
a cabinet provided on said rear surface of said diaphragm and defining open and closed spaces therein so as to expose parts of said rear surface of said diaphragm to said open and closed spaces, said cabinet additionally defining openable and closable spaces therein so as to expose other parts of said rear surface of said diaphragm to said openable and closable spaces.

15. A speaker system as set forth in claim 14, said cabinet having a rear wall, wherein one of said openable and closable spaces includes a partition wall spaced from said rear surface of said diaphragm by a predetermined distance, an inner edge connected between said partition wall and said rear surface of said diaphragm, and holes formed in said partition wall and said rear wall of said cabinet, a removable port member connected between said holes, and a cover for closing said hole in said rear wall of said cabinet after said removable port member is removed so as to define a closed space.

16. A speaker system according to claim 14, wherein said driving unit includes a plurality of driving elements each having a voice coil bobbin, a voice coil wound around each said voice coil bobbin, and a plurality of sets of input terminals for supplying independent driving signals respectively to each said coil bobbin.

17. A speaker system according to claim 14, wherein said driving unit includes a plurality of driving elements and a plurality of sets of input terminals, each of said plurality of sets of input terminals being connected to at least one of said driving elements.

18. A speaker system comprising:

an acoustic diaphragm having a front surface and a rear surface, said front surface carrying an image projecting screen thereon, and said diaphragm being composed of three plate sections, and a plurality of edge members connecting said three plate sections together;

a driving unit provided on said rear surface of said diaphragm; and a cabinet provided on said rear surface of said diaphragm and defining open and closed spaces as well as an openable and closable space to which said first, second and third plate sections of said diaphragm are exposed, respectively.

* * * * *